(12) United States Patent
Senatori

(10) Patent No.: US 10,852,764 B2
(45) Date of Patent: Dec. 1, 2020

(54) MULTI-BAND HINGE DEVICE

(71) Applicant: Hewlett-Packard Development Company, L.P., Houston, TX (US)

(72) Inventor: Mark Senatori, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 210 days.

(21) Appl. No.: 15/772,073

(22) PCT Filed: Feb. 17, 2016

(86) PCT No.: PCT/US2016/018263
§ 371 (c)(1),
(2) Date: Apr. 30, 2018

(87) PCT Pub. No.: WO2017/142532
PCT Pub. Date: Aug. 24, 2017

(65) Prior Publication Data
US 2018/0341288 A1  Nov. 29, 2018

(51) Int. Cl.
*G06F 1/16* (2006.01)
*H05K 5/00* (2006.01)
*H05K 7/00* (2006.01)

(52) U.S. Cl.
CPC .............. *G06F 1/1618* (2013.01); *G06F 1/16* (2013.01); *G06F 1/1681* (2013.01)

(58) Field of Classification Search
CPC ........ G06F 1/1681; G06F 1/1616; G06F 1/16; G06F 1/1613; G06F 1/1615; G06F 1/1633; F16C 11/04; H05K 5/0226

USPC ............. 361/679.26–679.29, 679.55, 679.56
See application file for complete search history.

(56) References Cited

U.S. PATENT DOCUMENTS

| | | | |
|---|---|---|---|
| 6,045,393 A | 4/2000 | Alpert | |
| 7,512,426 B2 | 3/2009 | Maata et al. | |
| 9,057,215 B1 * | 6/2015 | Horng | ........................ E05D 3/12 |
| 2005/0050686 A1 | 3/2005 | Kurokawa | |
| 2005/0122671 A1 | 6/2005 | Homer | |
| 2009/0000062 A1 | 1/2009 | Yamanami | |
| 2011/0304983 A1 | 12/2011 | Senatori | |
| 2013/0111704 A1 | 5/2013 | Mitsui | |
| 2014/0223693 A1 | 8/2014 | Hsu | |

(Continued)

FOREIGN PATENT DOCUMENTS

| CN | 203614585 U | 5/2014 |
|---|---|---|
| CN | 104956284 A | 9/2015 |

(Continued)

OTHER PUBLICATIONS

Lenovo's 2014 Consumer Portable Range includes Yoga 2, MIIX 2, new Y and Z series laptops and more, Jan. 5, 2014.

*Primary Examiner* — Anthony M Haughton
(74) *Attorney, Agent, or Firm* — Fabian VanCott

(57) ABSTRACT

In one example in accordance with the present disclosure a hinge device is described. The device includes a first shaft to be coupled to a first body and a second shaft to be coupled to a second body. A first band of the device is coupled to the shafts and travels along a first path between the first shaft and the second shaft as the shafts rotate in opposite directions. A second band of the device is coupled to the shafts and travels along a second path between the first shaft and the second shaft as the shafts rotate in opposite directions.

18 Claims, 10 Drawing Sheets

(56) References Cited

U.S. PATENT DOCUMENTS

| | | | | |
|---|---|---|---|---|
| 2014/0352113 A1* | 12/2014 | Chen | ................... | H04M 1/022 |
| | | | | 16/366 |
| 2015/0159413 A1* | 6/2015 | Chen | ..................... | E05D 3/122 |
| | | | | 16/342 |
| 2015/0267450 A1 | 9/2015 | Chiang | | |
| 2015/0345195 A1 | 12/2015 | Park | | |

FOREIGN PATENT DOCUMENTS

| | | |
|---|---|---|
| TW | M471615 | 2/2014 |
| TW | M478078 | 5/2014 |
| TW | 201428460 A | 7/2014 |
| TW | M502868 | 6/2015 |
| TW | M509504 | 9/2015 |
| WO | WO-9514842 A1 | 6/1995 |

* cited by examiner

MULTI-BAND HINGE DEVICE

BACKGROUND

Hinge devices rotably couple two components together. For example, via a hinge device a first body can rotate relative to a second body, while being mechanically coupled to the second body. In a specific example, a laptop computing device includes a display housing that holds a display screen of the laptop. The laptop also includes a base housing that houses an input device such as a keyboard and other computing components. A hinge device of the laptop allows the laptop to be closed, for example, during transportation. The laptop may be opened by rotating the display housing away from the base housing along a back edge where a hinge device is located. The hinge device along the back edge of the display housing and the base housing facilitates this opening.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
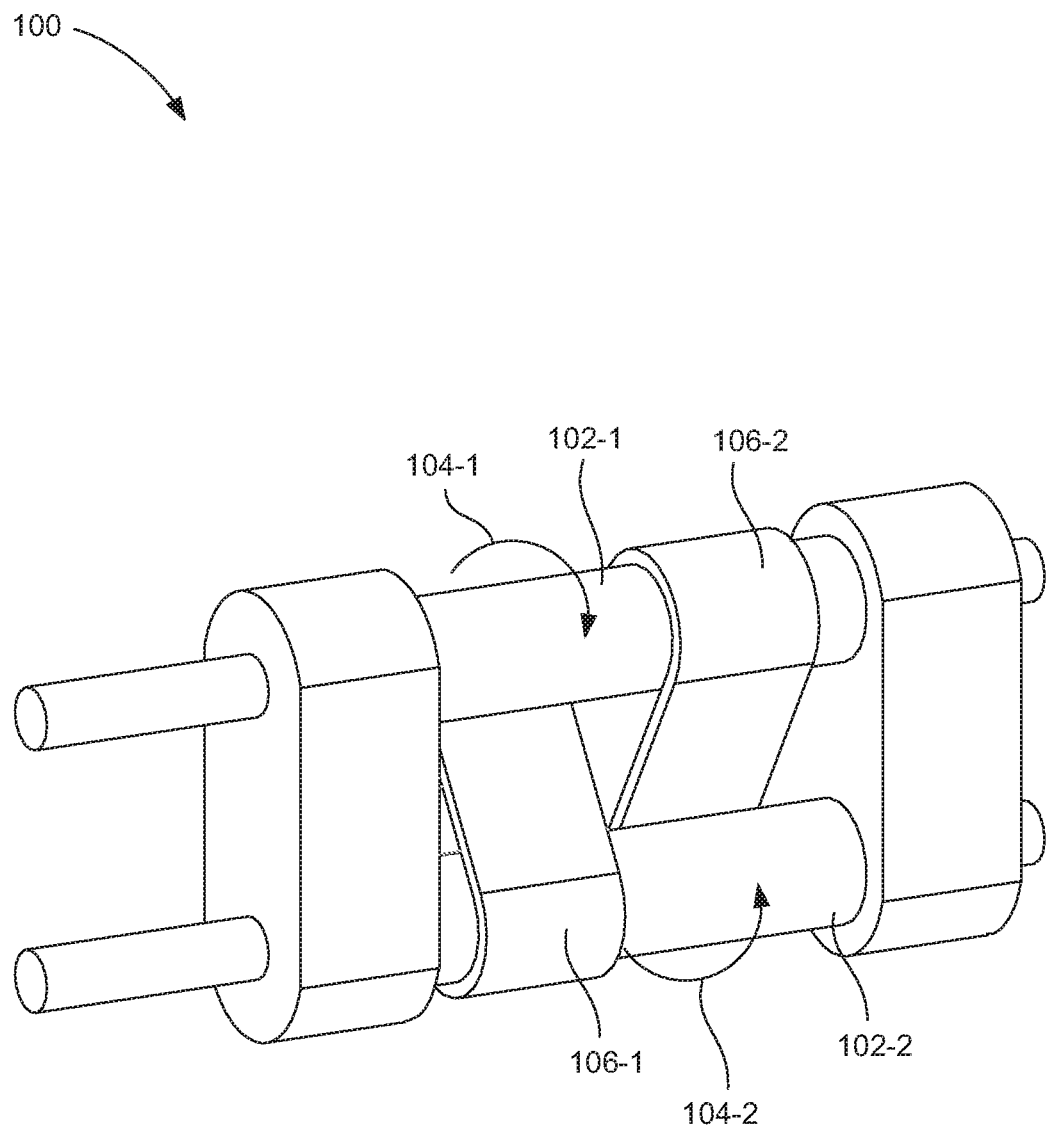
FIG. 1 is an isometric view of a multi-band hinge device, according to one example of the principles described herein.

Many devices in modern day rely on hinges to facilitate rotational motion. An everyday example are hinges on a door which allow the door to rotate relative to the door jamb. Hinges have also become widely used on electronic devices. For example, laptop computers and notebooks use hinges along a back edge to allow the laptop/notebook to open and close. The hinges on electronic devices such as laptops, tablets, and other electronic devices offer expanded usage possibilities for the electronic devices. For example, a display housing and a base housing may be spaced at a right angle relative to one another to facilitate use of the input device while viewing the display screen. In another example, the display housing may be further rotated, to approximately 360 degrees from the closed position, such that the back of the display housing is in contact with the back of the base housing, and the electronic device can be used as a tablet. However, while such hinge devices afford more options for usage of electronic devices, some characteristics of present hinge device reduces their effective implementation in electronic devices, or other devices.

For example, to satisfy user demand and to ensure a long life of the hinge and electronic device, a fluid, smooth, and robust hinging motion is desired. This in part can be achieved with a dual-shaft hinge where the hinges counter rotate. However, if the shafts rotate at different rates, or rather are unsynchronized, the hinging motion will not be fluid, and can subject the hinges to an early-life failure. Such a sloppy motion could also result in unintentional, contact between the display housing and base housing of an electronic device, which contact may lead to damage of either the display housing, the base housing, or both.

In one example, clutches with different frictional values have been used in an attempt to ensure a synchronized counter rotation. In these systems, as an electronic device is opened, one hinge clutch with higher friction would remain fixed and a clutch with lessor friction would rotate until it reached a hard stop, at which point the hinge clutch with the higher friction would then rotate. However, this is not a smooth rotation as two different resistances would be felt by the user as the device is opened. Moreover, such a clutch hinge system is complex, costly to manufacture, and uses more space to accommodate the clutches; space which may be valuable, or unavailable, in the overall electronic device layout.

In another example, gears are used to synchronize the hinge shafts. Specifically, two gears are used, one tied to each hinge pivot. Two smaller idler gears are used to keep the hinge pivot gears synchronized. However, a gear system uses lubricant such as grease, which can be messy. Moreover, similar to the clutch system, a gear system is complex, costly, and takes up a lot of space in the otherwise small hinge device.

Accordingly, the present specification describes a hinging device that includes multiple hinging shafts. To ensure the hinging shafts rotate at the same rate, or are synchronized, the hinging device includes multiple bands that are arranged such that the counter rotation of the hinging shafts is synchronized.

More specifically, the present specification describes a hinge device. The hinge device includes a first shaft to be coupled to a first body and a second shaft to be coupled to a second body. The device also includes a first band coupled to the shafts to travel along a first path between the first shaft and the second shaft as the shafts rotate in opposite directions. A second band is coupled to the shafts to travel along a second path between the first shaft and the second shaft as the shafts rotate in opposite directions.

In one example, the hinge device includes a first shaft coupled to a back edge of a first body and a second shaft coupled to a back edge of a second body. The second shaft is parallel with the first shaft. The first shaft and the second shaft counter-rotate relative to one another to facilitate rotation of the first body and the second body about their respective back edges. The first band of the hinge device wraps around the first shaft in a first direction, extends towards the second shaft, and wraps around the second shaft in a second direction. The second band of the hinge device wraps around the first shaft in the second direction, extends towards the second shaft, and wraps around the first shaft in the first direction. The bands maintain a synchronized rotational rate of the first shaft and the second shaft.

The present specification also describes an electronic device. The electronic device includes a display housing and a base housing. A hinge device rotationally couples the display housing and the base housing to one another. The hinge device includes a first shaft coupled to the display housing and a second shaft coupled to the base housing. The second shaft is parallel to the first shaft and the first shaft and the second shaft rotate in opposite directions about respective longitudinal axes as the electronic device is opened. The hinge device also includes a bracket to align and separate the first shaft and the second shaft. A first band of the hinge device is coupled to the shafts and wraps around the first shaft in a first direction as the electronic device opens. A second band of the hinge device is coupled to the shafts and wraps around the second shaft in a second direction as the electronic device opens.

Using a multi-band hinge system 1) ensures synchronized rotation of the different shafts to provide a smooth and fluid hinging operation, 2) prevents potentially damaging contact between the display housing and base housing of an electronic device, and 3) reduces the moving part count of the hinging device thereby ensuring a more robust and more endurable hinging device. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "path" refers to the path followed by the bands as the first shaft and the second shaft rotate. The paths are defined by the circumference of the shafts. For example, the path of a first band may be around the circumference of the first shaft, towards the second shaft and then around the circumference of the second shaft, albeit in a different direction, i.e., counter clockwise as opposed to clockwise.

Still further, as used in the present specification and in the appended claims, the term "synchronized" means that each of the first shaft and the second shaft rotate about a longitudinal axis at a constant rotational rate, relative to one another. For example, each shaft may rotate such that each rotates 180 degrees in the same amount of time. If the shafts are of differing diameter this may mean that the rotational rate of each shaft may be different, but synchronized rotation means that the difference in rotational speed is constant throughout the rotation.

Even further, as used in the present specification and in the appended claims, the term "a number of" or similar language is meant to be understood broadly as any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

Turning now to the figures, FIG. 1 is an isometric view of a multi-band hinge device (100), according to one example of the principles described herein. The hinge device (100) described herein may be used on any number of electronic devices. Examples of electronic devices include computers, laptop computers, personal digital assistants (PDAs), mobile devices, smartphones, gaming systems, and tablets, among other electronic devices. The hinge device (100) may also be used on other types of devices that implement rotational motion.

The hinge device (100) includes two shafts (102), specifically a first shaft (102-1) and a second shaft (102-2). As used in the present specification, the indicator "-*" refers to a specific instance of an element. For example, a first shaft is referenced as (102-1). The absence of the indicator "-*" refers to the element in general. For example, a generic shaft is referenced as (102).

Each shaft (102) is to be coupled to a body. For example, the first shaft (102-1) may be coupled to a first body and the second shaft (102-2) may be coupled to a second body. The first and second body are to rotate relative to one another. For example, as will be described below, the first body may be a display housing of a laptop device and the second body may be a base housing that houses components of the laptop device such as processors, memory, drivers, input/output ports, and input components such as a keyboard. As the two bodies are rotated away from or towards each other, for example when opening or closing a laptop device, the corresponding shafts (102) rotate. In an opening action, the first shaft (102-1) may rotate in one direction, as indicated by the arrow (104-1) and the second shaft (102-2) may rotate in an opposite direction, as indicated by the arrow (104-2). Similarly, while closing, the first shaft (102-1) and the second shaft (102-2) may rotate in opposite directions from one another, for example in directions opposite those depicted by the arrows (104-1, 104-2).

As described above, if the rotation of the shafts (102) is unsynchronized, i.e., the difference in rotational rate of the shafts (102) changes throughout the course of rotation, a sloppy and rough rotation of the corresponding bodies will result. Such sloppy motion can be unsatisfactory to a customer, and may also reduce the life of the hinge device (100), thereby effecting mechanical performance of the device on which the hinge device (100) is installed and potentially resulting in damage to the device on which the hinge device (100) is installed.

Accordingly, the hinge device (100) includes bands (106) to control the rotation of the shafts (102). Specifically, a first band (106-1) is coupled to both the first shaft (102-1) and the second shaft (102-2) and travels along a first path between the first shaft (102-1) and the second shaft (102-2) as the shafts (102) rotate in opposite directions, for example during the opening and closing of an electronic device.

Similarly, a second band (106-2) is coupled to both the first shaft (102-1) and the second shaft (102-2) and travels along a second path between the first shaft (102-1) and the second shaft (102-2) as the shafts (102) rotate in opposite directions, for example during the opening and closing of an electronic device. The first band (106-1) and the second band (106-2) unwrap from, and wrap onto different shafts for a given operation. For example, as the two bodies rotate away from one another, the first band (106-1) unwraps from the second shaft (102-2) and wraps onto the first shaft (102-1). By comparison, the second band (106-2) unwraps from the first shaft (102-1) and wraps onto the second shaft (102-2). More detail regarding the motion of the shafts (102) and bands (106) is provided below in regards to FIGS. 2A and 2B.

The bands (106) may be formed such that they are able to deform around the shafts (102). For example, the bands (106) may be formed from a metallic material, a carbon fiber, a polymeric material, or other flexible material that can deform around the shafts (102). The bands (106) may have different cross-sectional shapes. For example, as depicted in FIG. 1, the bands (106) may have a rectangular cross-section. However, as indicated in FIG. 5 below, the bands (106) may have other cross-sectional shapes, such as a circular cross-section.

Utilizing the bands (106) as described herein ensures that both shafts (102) rotate at a constant rotational rate through the entire rotational cycle. Moreover, it maintains the difference in rotational rate of the two shafts (102). For example, if the shafts (102) have the same diameter, the bands (106) ensure that the shafts (102) are rotating at the same rate throughout the course of rotation. Doing so ensures a consistent, fluid, and smooth hinging operation.

In some examples, the shafts (102) have different diameters to add a virtual gear ratio to the hinge movement. Such a virtual gear ratio emulates an actual gear ratio. For example, when the device is closed, it may be desirable for the display housing to be flush with the bottom part of the base housing at the front. However, in a tablet mode, i.e., 360 degrees from closed, it may be desirable for the display housing to over overhang so that the antennas, which are at the top of the display housing overhang the base housing to prevent antenna interference. In other words, the shafts (102) may be different diameters so that the starting, i.e., open, and ending, i.e., closed positions may be different.

Figure 2A:
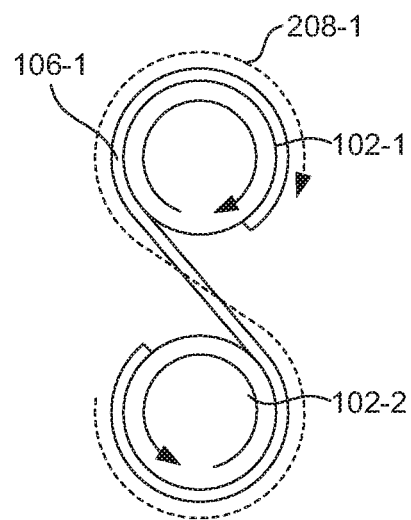
FIGS. 2A-2D are end views of a multi-band hinge device, according to one example of the principles described herein.
Figure 2B:
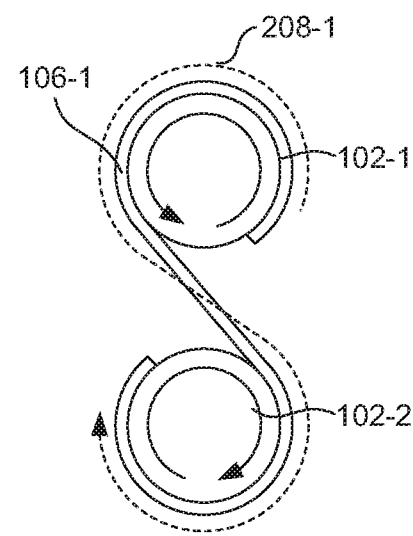
Figure 2C:
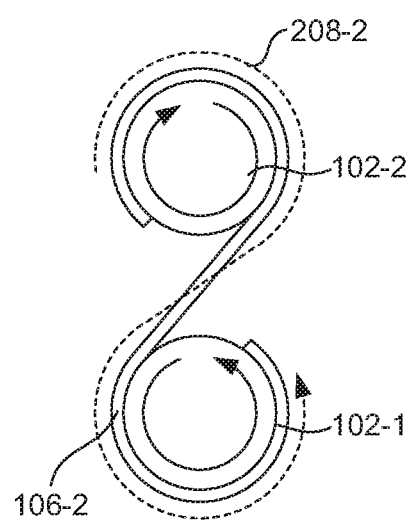
Figure 2D:
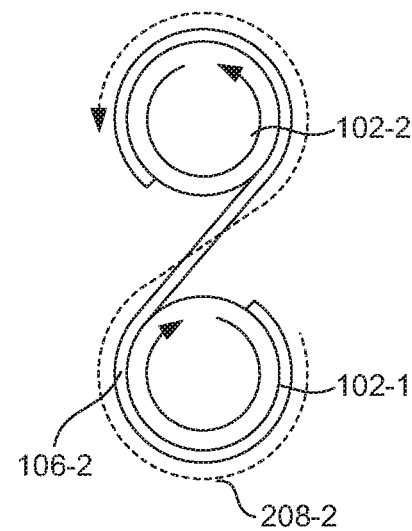

FIGS. 2A-2D are end views of a multi-band hinge device (100), according to one example of the principles described herein. Specifically, FIGS. 2A and 2B are views of the multi-band hinge device (100) from one end point. For simplicity in FIGS. 2A-2B, the second band (106-2) has been omitted from the illustration to more clearly illustrate the motion of the first band (106-1). FIGS. 2C and 2D are views of the multi-band hinge device (100) from the same end point, but the first band (106-1) has been omitted from the illustration to more clearly illustrate the motion of the second band (106-2).

As described above, the first shaft (102-1) and the second shaft (102-2) rotate in opposite directions for a given operation. For example, when two bodies such as a display housing and a base housing are rotated away from each other, such as when opening an electronic device, the first shaft (102-1) rotates in one direction, such as a clockwise direction, and the second shaft (102-2) rotates in an opposite direction, such as a counterclockwise direction. FIGS. 2A and 2C illustrate the rotation away from one another of the bodies coupled to the corresponding shafts (102). During rotation, each band (106) follows a particular path (208) in either of two directions. Each path (208) may be a different shape. For example, the first path (208-1) followed by the first band (106-1) maybe an S-shaped path around the first shaft (102-1), towards the second shaft (102-2) and around the second shaft (102-2). By comparison, the second path (208-2) followed by the second band (106-2) may be a reverse S-shaped path around the first shaft (102-1), towards the second shaft (102-2) and around the second shaft (102-2). Put another way, the two bands (106-1, 106-2) are connected to the two shafts (102) at opposite points of a diameter such that they form a virtual figure eight around the two shafts (102). Accordingly, as the first shaft (102-1) is rotated in one direction and the second shaft (102-2) is rotated in another direction, the corresponding bodies rotate in a synchronized fashion relative to one another in a complete 360 degree motion. In other words, the shafts (102) operate in unison, so as one rotates in one direction, the other rotates in an equal amount in the opposite direction via the bands (106).

Note that as the first shaft (102-1) is rotated in a clockwise direction and the second shaft (102-2) is rotated in a counter clockwise direction, the direction of the first band (106-1) along the first path (208-1) may be from the second shaft (102-2) towards the first shaft (102-1). In other words, as the first shaft (102-1) rotates clockwise, and the second shaft (102-2) rotates counter clockwise, the first band (106-1) may unwrap from the second shaft (102-2) and wrap onto the first shaft (102-1) as depicted in FIG. 2A.

By comparison, as the first shaft (102-1) is rotated in a clockwise direction and the second shaft (102-2) is rotated in a counter clockwise direction, the direction of the second band (106-2) along the second path (208-2) may be from the first shaft (102-1) towards the second shaft (102-2). In other words, as the first shaft (102-1) rotates clockwise, and the second shaft (102-2) rotates counter clockwise, the second band (106-2) may unwrap from the first shaft (102-1) and wrap onto the second shaft (102-2) as depicted in FIG. 2C.

FIGS. 2B and 2D illustrate the rotation of the corresponding bodies towards one another. For example, in FIGS. 2B and 2D, the first shaft (102-1) rotates in a counter clockwise direction and the second shaft (102-2) is rotated in a clockwise direction.

Note that as the first shaft (102-1) is rotated in a counter clockwise direction and the second shaft (102-2) is rotated in a clockwise direction, the direction of the first band (106-1) along the first path (208-1) may be from the first shaft (102-1) towards the second shaft (102-2). In other words, as the first shaft (102-1) rotates counter clockwise, and the second shaft (102-2) rotates clockwise, the first band (106-1) may unwrap from the first shaft (102-1) and wraps onto the second shaft (102-2) as depicted in FIG. 2B.

By comparison, as the first shaft (102-1) is rotated in a counter clockwise direction and the second shaft (102-2) is rotated in a clockwise direction, the direction of the second band (106-2) along the second path (208-2) may be from the second shaft (102-2) towards the first shaft (102-1). In other words, as the first shaft (102-1) rotates counter clockwise, and the second shaft (102-2) rotates clockwise, the second band (106-2) may unwrap from the second shaft (102-2) and wrap onto the first shaft (102-1) as depicted in FIG. 2D.

The bands (106) may be long enough such that the first shaft (102-1) can rotate 180 degrees about a first shaft (102-1) longitudinal axis and the second shaft (102-2) can rotate 180 degrees about a second shaft (102-2) longitudinal axis. Put another way, each band (106) is attached to the shafts (102) at a position that allows the shafts (102) to rotate freely 180 degrees before it is stopped from further rotation via the attachment of the bands (106) to the shafts (102). Having the paths (208) of the bands (106) be S-shaped and reverse S-shaped allows for fluid, and synchronized rotation of the shafts (102) thus ensuring a smooth rotation of the coupled bodies.

Figure 3:
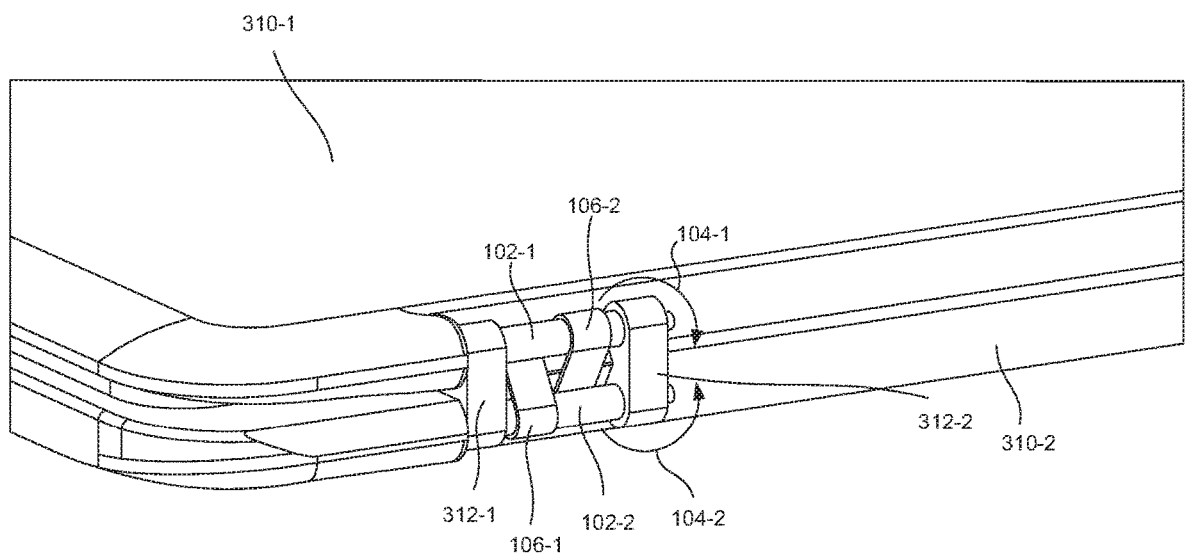
FIG. 3 is a diagram of a multi-band hinge device coupled to first and second bodies, according to one example of the principles described herein.

FIG. 3 is a diagram of a multi-band hinge device (FIG. 1, 100) coupled to first and second bodies (310-1, 310-2), according to one example of the principles described herein. As described above, the multi-band hinge device (FIG. 1, 100) ensures the fluid, smooth, and synchronized rotation of two bodies relative to one another. For example, the first body (310-1) may be mechanically coupled to the second body (310-2) along a back edge. The first body (310-1) may rotate away from the second body (310-2) about this back edge. For example, as an electronic device is opened such that the screen can be viewed, the first body (310-1), which houses the screen may be rotated away from the second body (310-2) which houses the input, and other, components. The first body (310-1) may also rotate towards the second body (310-2) along this back edge, for example, as an electronic device is closed. Accordingly, the hinge device (FIG. 1, 100) is coupled along the back edge of the bodies (310). Specifically, the first shaft (102-1) is coupled to a back edge of the first body (310-1) and the second shaft (102-2) is coupled to a back edge of the second body (310-2). As the first body (310-1) and the second body (310-2) are rotated towards or away from each other, the corresponding shafts (102) rotate in opposite directions. In some examples, both ends of the first shaft (102-1) are coupled to the first body (310-1) and both ends of the second shaft (102-2) are coupled to the second body (310-2).

As a constant rotational rate, or a constant ratio of rotational rate is desired, a multi-band system is used. Specifically, a first band (106-1) is wrapped around the first shaft (102-1) in a first direction, extends towards the second shaft (102-2), and wraps around the second shaft (102-2) in a second direction. As the bodies (310-1, 310-2) rotate away from each other the first band (106-1) is unwrapped from one shaft and wrapped onto the other. More specifically, the first band (106-1) may unwrap from the second shaft (102-2) and wrap onto the first shaft (102-1).

The path of the second shaft is opposite. For example, as the bodies (310-1, 310-2) rotate away from each other, the second band is unwrapped from the first shaft (102-1) and wrapped onto the second shaft (102-2). Having the different bands (106) wrap onto different shafts (102) during a given operation ensures that the rotation is smooth and constant. In other words, the mirror-paths of the bands (106) ensures that a synchronized rotational rate of the first shaft (102-1) and the second shaft (102-2) is achieved, which synchronized rotational rate enhances the feel and durability of the hinge device (FIG. 1, 100).

In some examples, the hinge device (FIG. 1, 100) includes a bracket (312). The bracket (312) may include multiple components (312-1, 312-2). The bracket (312) separates the first shaft (102-1) from the second shaft (102-2), providing space for the first body (310-1) and the second body (310-2) to rotate along the back edge without interfering with one another. Also, as depicted in FIG. 3, the bracket (312) aligns the longitudinal axis of the second shaft (102-2) to be parallel with the longitudinal axis of the first shaft (102-1). Were the shafts not parallel, they would not fluidly rotate due to interference, or off-axis rotation of either of the bodies (310-1, 310-2). The bracket (312) also vertically aligns the shafts (102) so as to accommodate a display housing, or other first body (310-1) that is disposed on top of a second body (310-2), or base housing, when closed or when in a fully open position.

Figure 4:
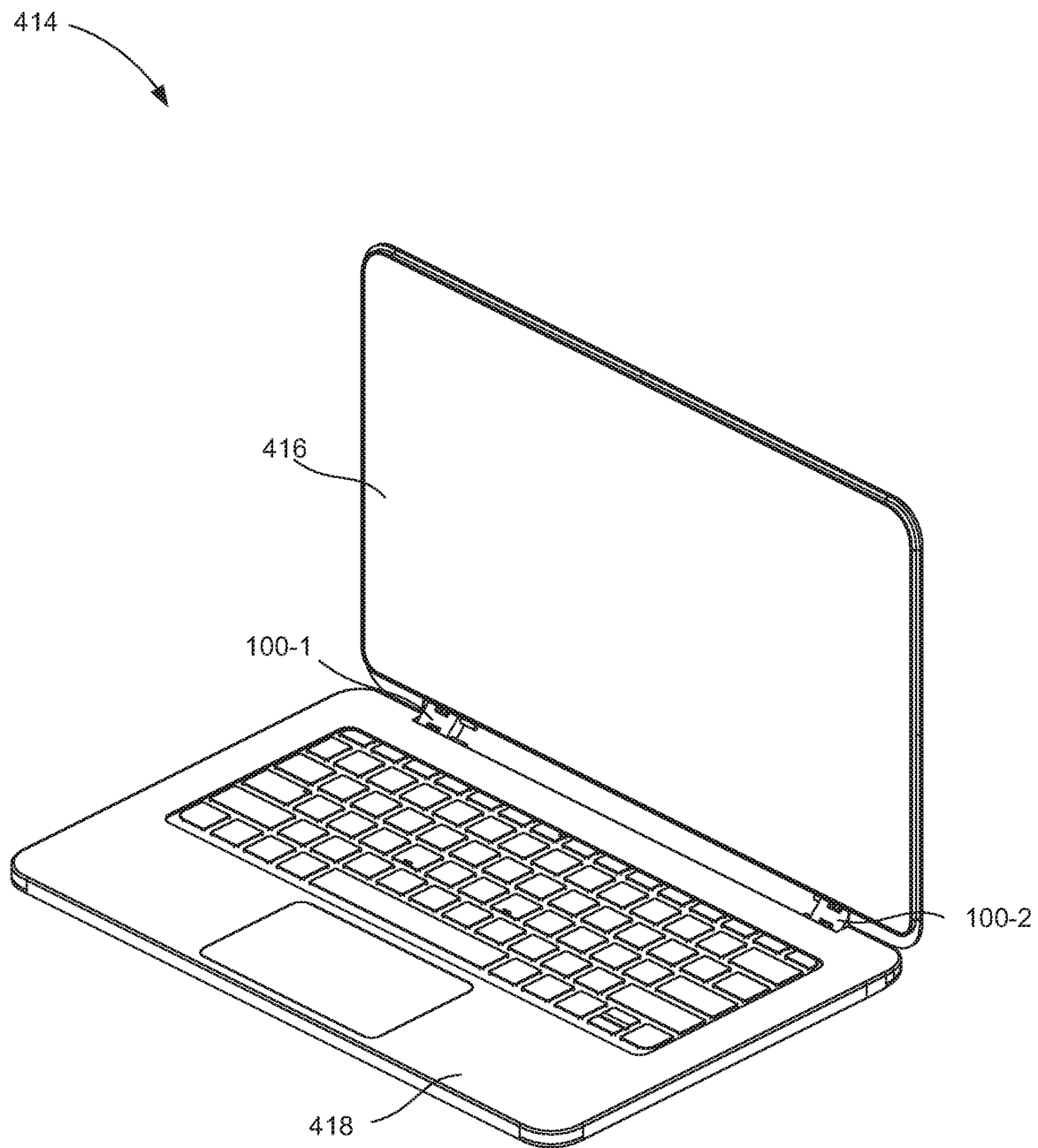
FIG. 4 is a diagram of an electronic device with multiple multi-band hinge devices.

FIG. 4 is a diagram of an electronic device (414) with multiple multi-band hinge devices (100-1, 100-2). As described above, the multi-band hinge devices (100) may be used on any number of devices. One example, is an electronic device (414) such as a laptop computer or a tablet. In this example, the electronic device (414) includes a display housing (416).

The display housing (416) houses a display device that allows a user of the electronic device (414) to interact with and implement the functionality of the electronic device (414). Examples of display devices include a computer screen, a laptop screen, a mobile device screen, a personal digital assistant (PDA) screen, and a tablet screen, among other display devices.

The electronic device (414) also includes a base housing (418). The base housing (418) houses other hardware components of the electronic device (414). Among these hardware components may be a number of processors, a number of data storage devices, a number of peripheral device adapters (538), and a number of network adapters. These hardware components may be interconnected through the use of a number of busses and/or network connections. The base housing (418) may also include input components such as a keyboard.

As described above, the display housing (416) and the base housing (418) may rotate relative to one another. For example, in a closed position the display housing (416) and the base housing (418) may be positioned such that their front surfaces, i.e., the surfaces that contain the display screen and the keyboard, are facing one another or are in contact with one another. To open the electronic device (414), the display housing (416) is rotated about the hinge point where the hinge devices (100) are located, away from the base housing (418). In some examples, the rotation may be 360 degrees, meaning that the back surfaces of the display housing (416) and the base housing (418) are in contact. Accordingly, the electronic device (414) includes multiple hinge devices (100) to rotationally couple the display housing (416) and the base housing (418) to one another.

Each hinge device (100) includes a first shaft (FIG. 1, 102-1) coupled to the display housing (416) and a second shaft (FIG. 1, 102-2) coupled to the base housing (418). As described above, the first shaft (FIG. 1, 102-1) is parallel to the second shaft (FIG. 1, 102-2). Moreover, as described above, the first shaft (FIG. 1, 102-1) and the second shaft (FIG. 1, 102-2) rotate in opposite directions, for example, counter clockwise and clockwise, respectively, about their respective longitudinal axes as the electronic device (414) is opened. A bracket (FIG. 3, 312) of the hinge devices (100) aligns the shafts (FIG. 1, 102) and separates the shafts (FIG. 1, 102) so as to provide clearance between the display housing (416) and the base housing (418) during rotation.

In an opening operation, the first band (FIG. 1, 106-1) which is coupled to the shafts (FIG. 1, 102) is wrapped around the first shaft (FIG. 1, 102-1) in a first direction. The first direction may be a clockwise direction. In the opening operation, the second band (FIG. 1, 106-2) which is coupled to the shafts (FIG. 1, 102) is wrapped around the second shaft (FIG. 1, 102-2) in a second direction. The second direction may be a counter clockwise direction. During a closing operation, the first band (FIG. 1, 106-1) wraps around the second shaft (FIG. 1, 102-2) in the first direction, i.e., clockwise direction and the second band (FIG. 1, 106-2) wraps around the first shaft (FIG. 1, 106-1) in the second direction, i.e., counter clockwise direction.

In some examples, each hinge device (100) may be covered by a housing that houses the first shaft (FIG. 1, 102-1) the second shaft (FIG. 1, 102-2), the first band (FIG. 1, 106-1), and the second band (FIG. 1, 106-2).

Figure 5A:
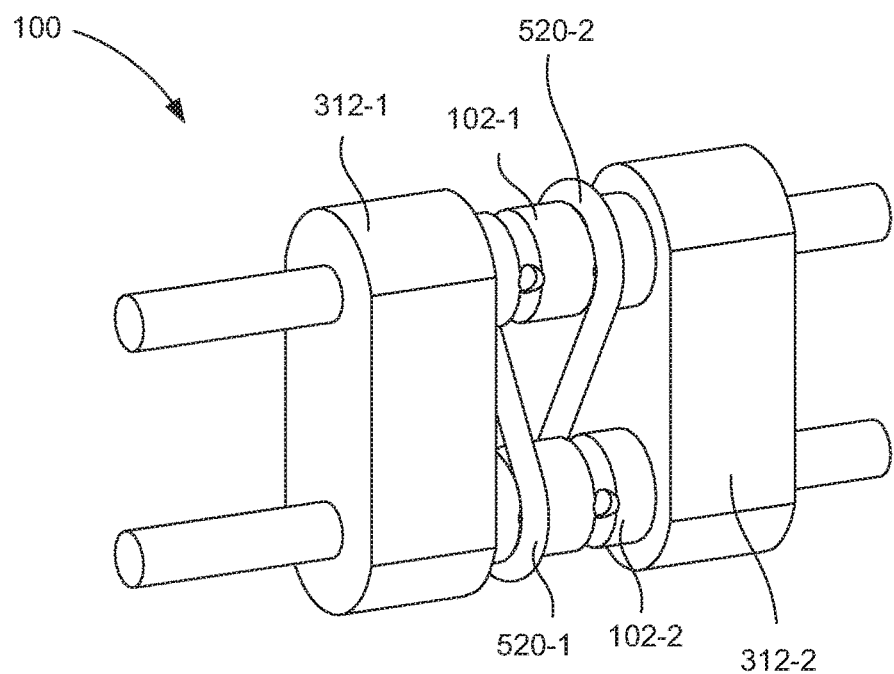
FIGS. 5A and 5B are isometric views of a multi-band hinge device, according to another example of the principles described herein.
Figure 5B:
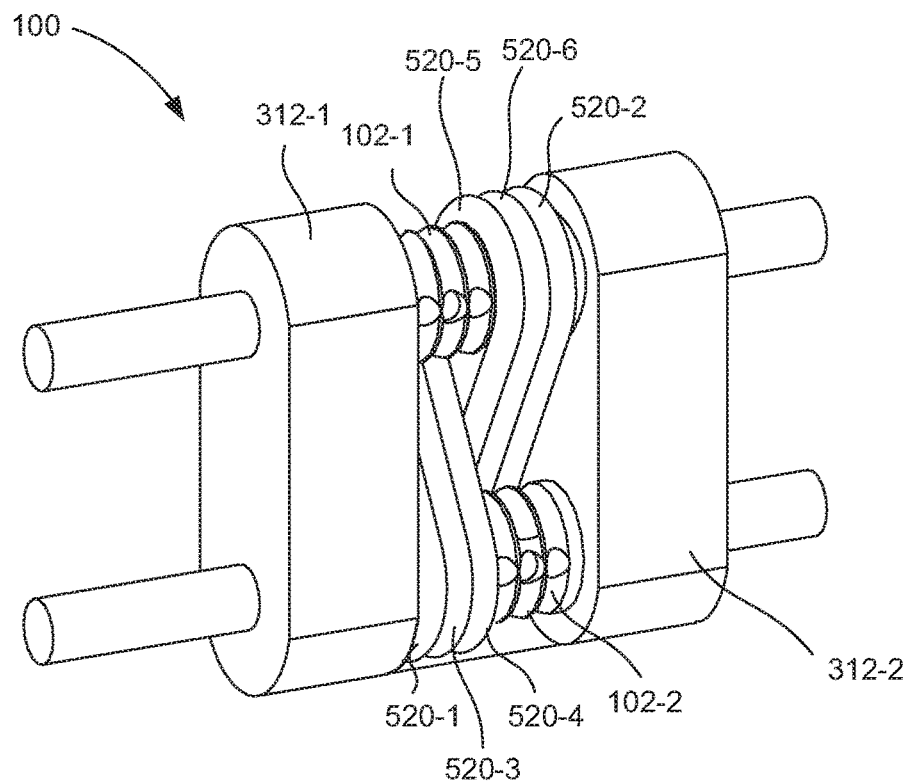

FIGS. 5A and 5B are isometric views of a multi-band hinge device (100), according to another example of the principles described herein. As described above, the multi-band hinge device (100) includes brackets (312) to align and separate the shafts (102). The hinge device (100) also includes bands (FIG. 1, 106) to ensure that the shafts (102) synchronically rotate. In some examples, the bands (FIG. 1, 106) may have a circular cross-section. In other words, the bands (FIG. 1, 106) may be cables (520-1,520-2). The cables (520) are small and therefore allow for the hinge devices (100) to be implemented on smaller devices. In order to provide greater resistance, the hinge device (100) may include more than two cables (520). These additional cables (520-3, 520-4, 520-5, 520-6) may follow either the S-shaped path (FIG. 2, 208-1) of the first cable (520-1) or may follow the reverse S-shaped path (FIG. 2, 208-2) of the second cable (520-2). In some examples, the multiple cable (520) strands may be wrapped together to form a single cable fiber which is used to ensure fluid rotation of the shafts (102).

Figure 6A:
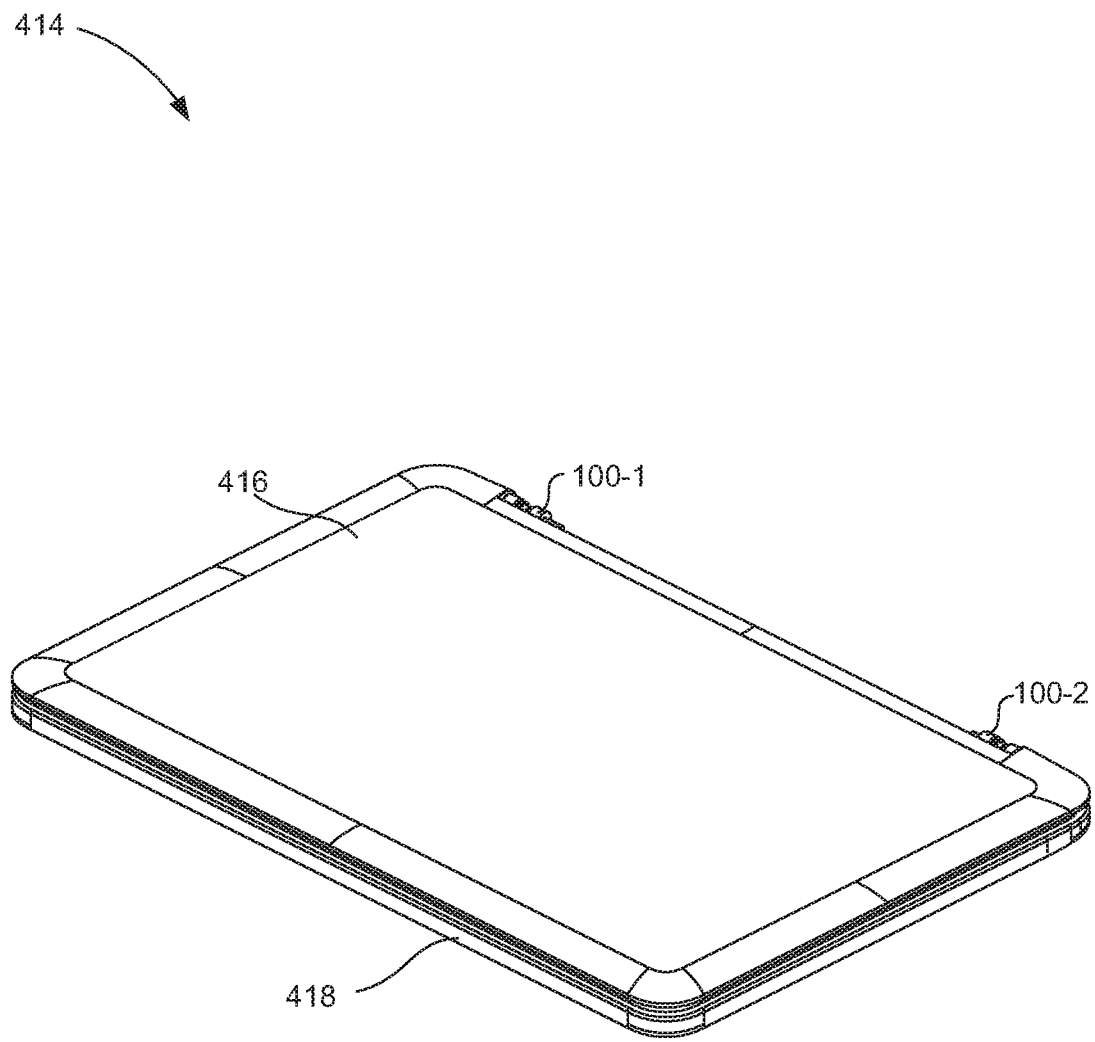
FIGS. 6A-6E are views of an electronic device with a multi-band hinge device in various stages of opening and closing, according to one example of the principles described herein.

FIGS. 6A-6E are views of an electronic device (414) with multi-band hinge devices (100-1, 100-2) in various stages of opening and closing, according to one example of the principles described herein. For example, in an initial position as depicted in FIG. 6A, such as when an electronic device (414) is closed, the first band (FIG. 1, 102-1) may be wrapped around the second shaft (FIG. 1, 102-2) and extend toward the first shaft (FIG. 1, 102-1). By comparison, the second band (FIG. 1, 106-2) may be wrapped around the first shaft (FIG. 1, 102-1) and extend towards the second shaft (FIG. 1, 102-2). Note that in a closed position, a display screen surface of the display housing (416) faces an input/output surface of the base housing (418).

Figure 6B:
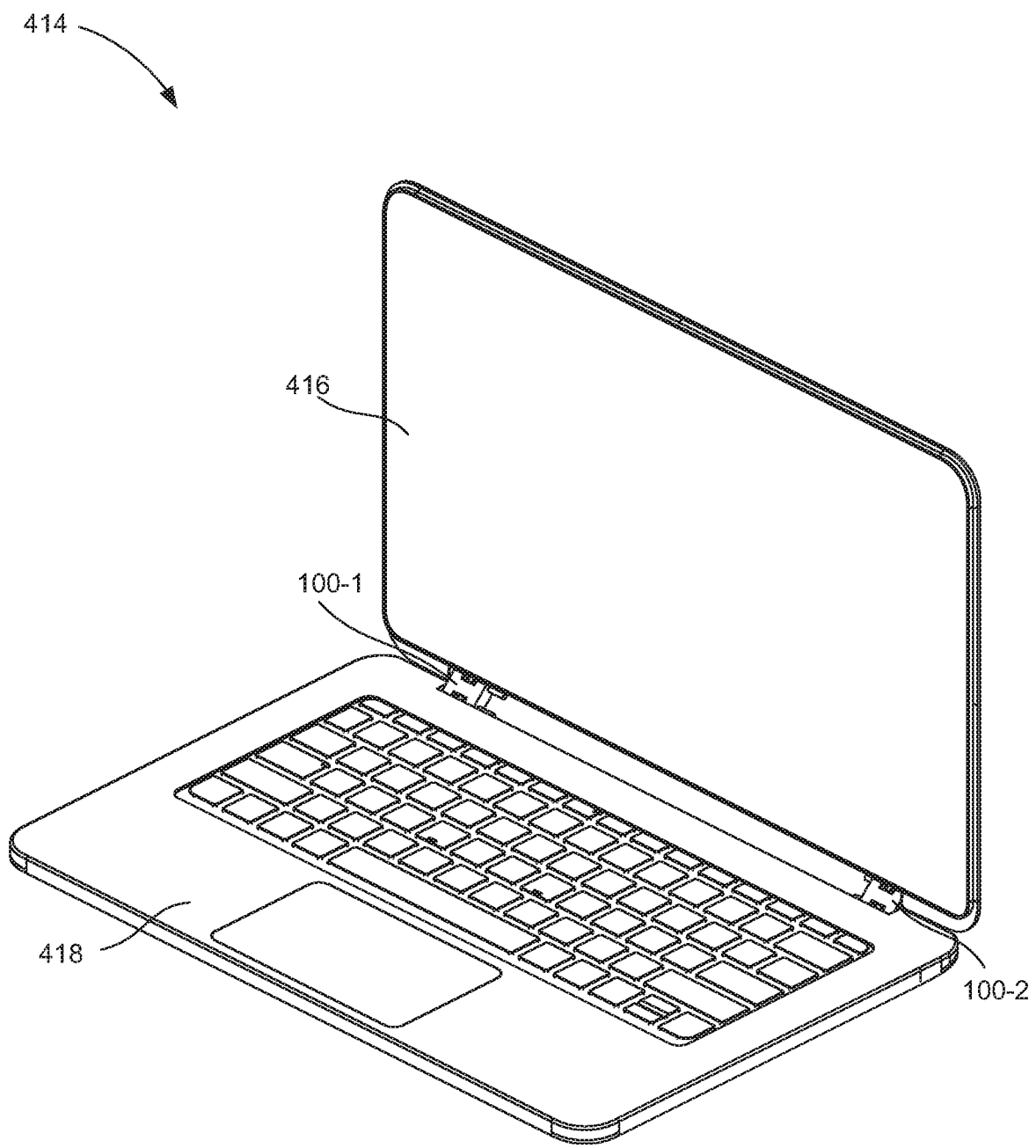
Figure 6C:
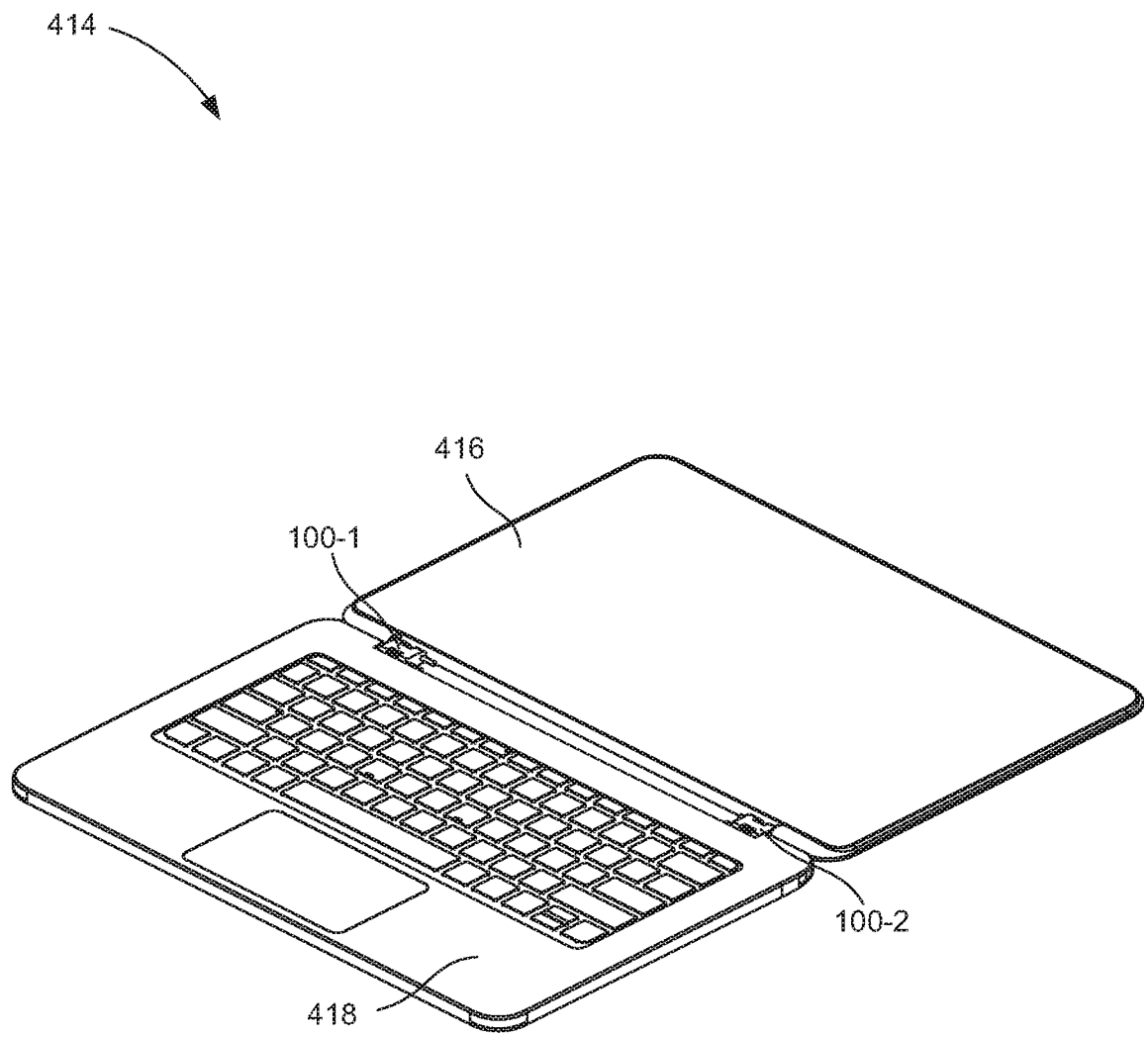
Figure 6D:
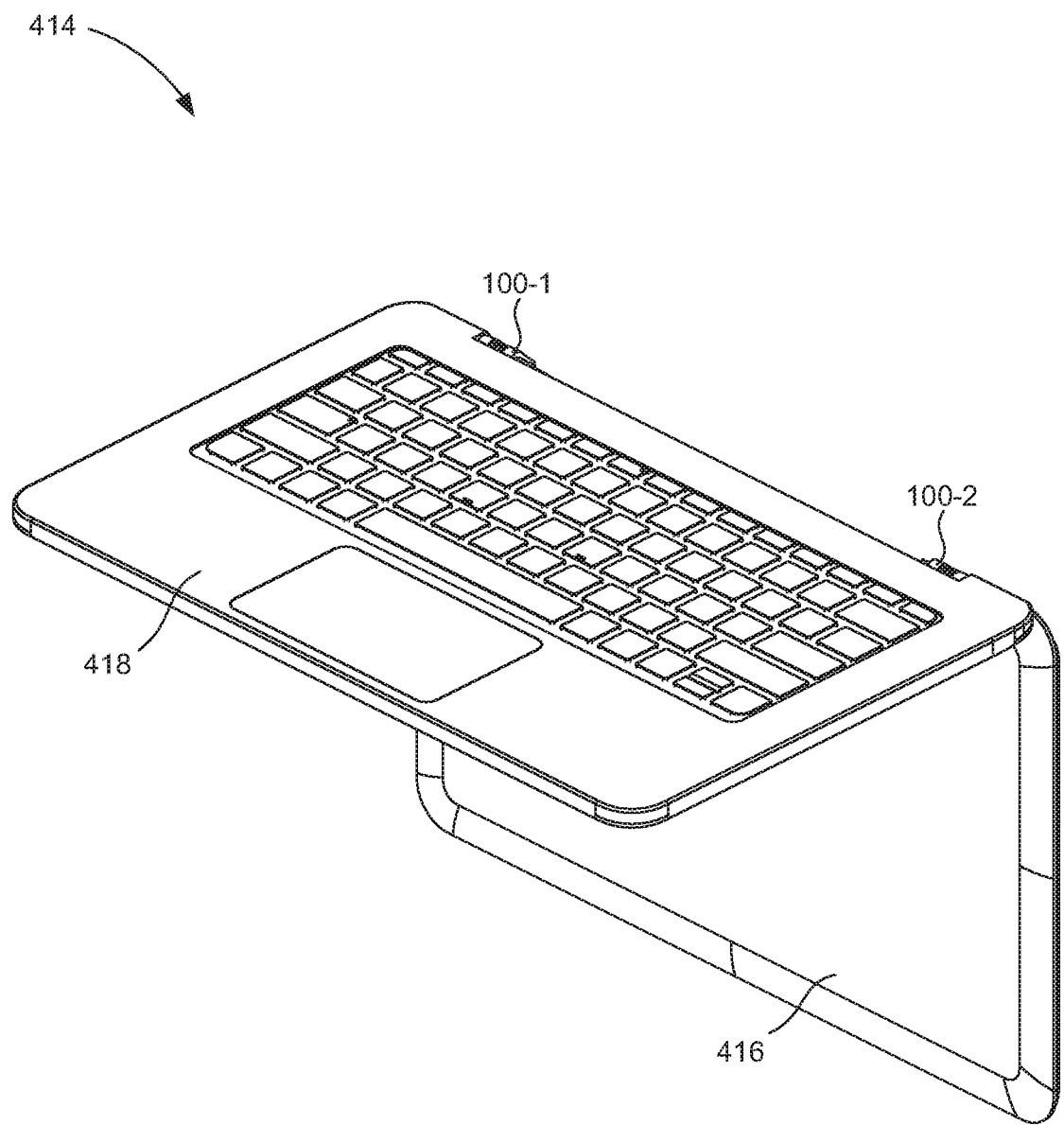

The first band (FIG. 1, 106-1) is wrapped around the second shaft (102-2) such that as the second shaft (FIG. 1, 102-2) rotates when the device is being opened, as depicted in FIGS. 6B-6D, the first band (FIG. 1, 106-1) unwraps from the second shaft (FIG. 1, 102-2) and wraps onto the first shaft (FIG. 1, 102-1). Similarly, the second band (FIG. 1, 106-2) is wrapped around the first shaft (FIG. 1, 102-1) such that as the first shaft (FIG. 1, 102-1) rotates when the device is being opened, as depicted in FIGS. 6B-6D, the second band (FIG. 1, 106-2) unwraps from the first shaft (FIG. 1, 102-1) and wraps onto the second shaft (FIG. 1, 102-2). In FIG. 6B, the electronic device (414) is in an upright position. That is, the display housing (416) is perpendicular to the base housing (418). In FIG. 6C, the electronic device (414) is in a 180-degree position. That is the display housing (416) is rotated 180 degrees from the closed position. In FIG. 6D, the electronic device (414) is in a position towards fully open. That is the display housing (416) is rotated past the 180-degree position, towards a fully-open position.

Figure 6E:
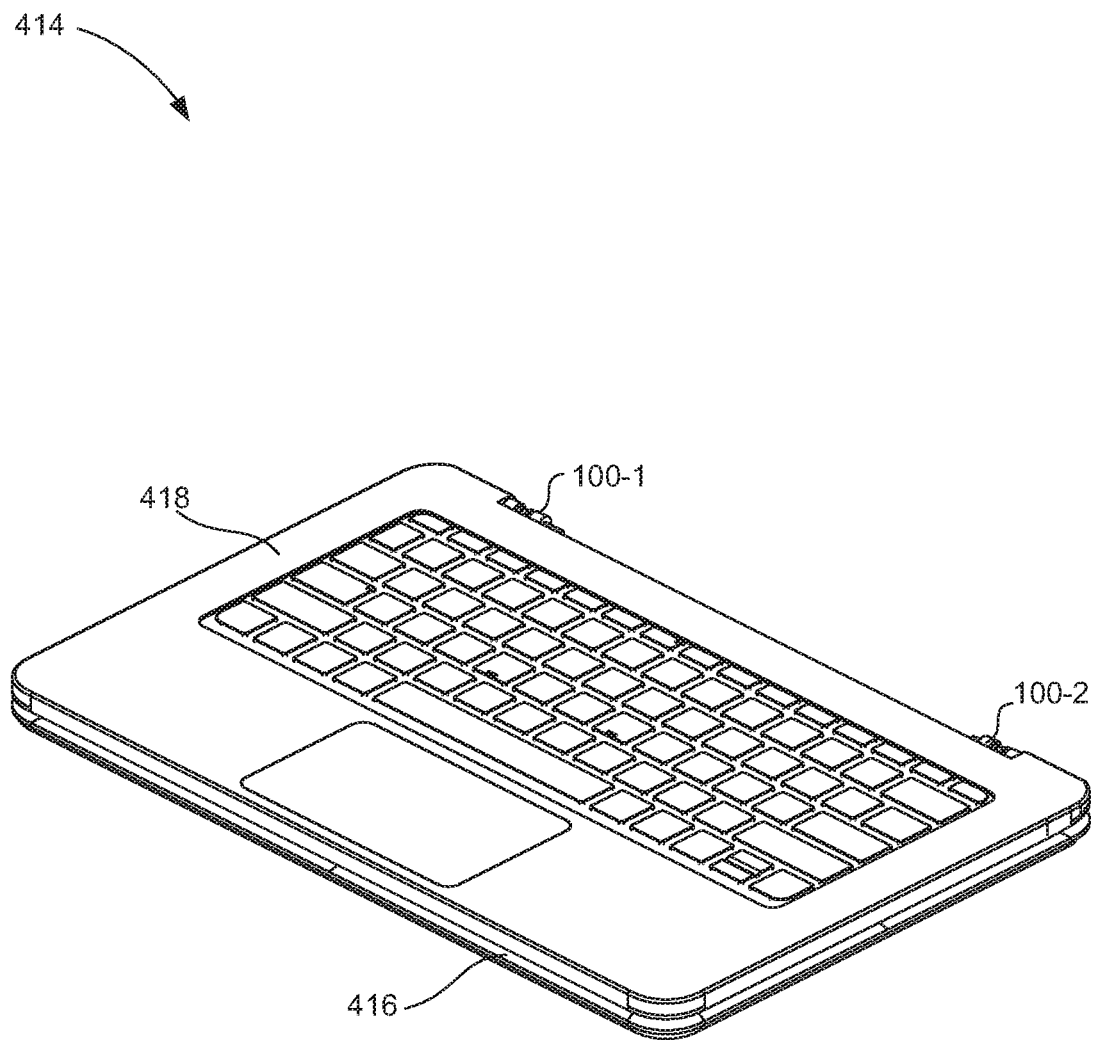

When rotated a full 360 degrees, as indicated in FIG. 6E, the first band (FIG. 1, 106-1) is wrapped around the first shaft (FIG. 1, 102-1) and the second band (FIG. 1, 106-2) is wrapped around the second shaft (FIG. 1, 102-2).

When fully open, as depicted in FIG. 6E, the first band (FIG. 1, 106-1) is wrapped around the first shaft (FIG. 1, 102-1) such that as the second shaft (FIG. 1, 102-2) rotates when the device is being closed, for example, the second shaft (FIG. 1, 102-2) is rotated clockwise, the first band (FIG. 1, 106-1) unwraps from the first shaft (FIG. 1, 102-1) and wraps onto the second shaft (FIG. 1, 102-2). Similarly, the second band (FIG. 1, 106-2) is wrapped around the second shaft (FIG. 1, 102-2) such that as the first shaft (FIG. 1, 102-1) rotates when the device is being closed, for example, the first shaft (FIG. 1, 102-1) is rotated counter clockwise, the second band (FIG. 1, 106-2) unwraps from the second shaft (FIG. 1, 102-2) and wraps onto the first shaft (FIG. 1, 102-1). In the fully open position depicted in FIG. 6E, the non-display surface of the display housing (416) faces the non-input surface of the base housing (418). In other words, the display surface of the display housing (416) and the input surface of the base housing (418) are facing away from one another.

Using a multi-band hinge system 1) ensures synchronized rotation of the different shafts (FIG. 1, 102) to provide a smooth and fluid hinging operation, 2) prevents potentially damaging contact between the display housing (FIG. 4, 416) and base housing (FIG. 4, 418) of an electronic device (FIGS. 4, 414), and 3) reduces a moving part count of the hinging device (FIG. 1, 100) thereby ensuring a more robust and more endurable hinging device (FIG. 1, 100). However, it is contemplated that the devices disclosed herein may provide useful in addressing other matters and deficiencies in a number of technical areas. Therefore the systems and methods disclosed herein should not be construed as addressing any of the particular matters.

The preceding description has been presented to illustrate and describe examples of the principles described. This description is not intended to be exhaustive or to limit these principles to any precise form disclosed. Many modifications and variations are possible in light of the above teaching.

What is claimed is:

1. A hinge device comprising:
a first shaft to be coupled to a first body;
a second shaft to be coupled to a second body;
a first band having a planar surface directly coupled to and in contact with an outer surface of the shafts to travel along a first path between the first shaft and the second shaft as the shafts rotate in opposite directions; and
a second band having a planar surface directly coupled to and in contact with an outer surface of the shafts to travel along a second path between the first shaft and the second shaft as the shafts rotate in opposite directions, to wrap around the second shaft in a counter-clockwise direction while unwrapping from the first shaft and while the first band wraps around the first shaft, and to wrap around the first shaft in a counter-clockwise direction while unwrapping from the second shaft and while the first band wraps around the second shaft.

2. The hinge device of claim 1, wherein:
the first path is an S-shaped path around the first shaft, towards the second shaft, and around the second shaft; and
the second path is a reverse S-shaped path around the first shaft, towards the second shaft, and around the second shaft.

3. The hinge device of claim 1, wherein at least one of the first band and the second band have a rectangular cross section.

4. The hinge device of claim 1, wherein at least one of the first band and the second band have a circular cross section.

5. The hinge device of claim 1, wherein:
the device comprises more than two bands; and
additional bands to travel along either the first path or the second path.

6. The hinge device of claim 1, further comprising a housing to house the first shaft, the second shaft, the first band, and the second band.

7. The hinge device of claim 1, wherein the bands are formed of at least one of a metal, a carbon fiber, and a polymer.

8. The hinge device of claim 3, wherein the first band is to deform around the first shaft and the second band is to deform around the second shaft as the shafts rotate in opposite directions.

9. The hinge device of claim 1, wherein the first shaft has a first diameter and the second shaft has a second diameter different than the first diameter.

10. A hinge device comprising:
a first shaft coupled to a back edge of a first body;
a second shaft coupled to a back edge of a second body and parallel with the first shaft, wherein the first shaft and the second shaft are to counter-rotate relative to one another to facilitate rotation of the first body and the second body about their respective back edges;
a first band to:
wrap around the first shaft in a first direction with a surface area of the first band in direct contact with an outer circumferential surface area of the first shaft;
extend towards the second shaft; and
wrap around the second shaft in a second direction;

a second band to:
  wrap around the first shaft in the second direction with a surface area of the second band in direct contact with an outer circumferential surface area of the first shaft;
  extend towards the second shaft; and
  wrap around the first shaft in the first direction; and
wherein the bands maintain a synchronized rotational rate of the first shaft and the second shaft.

11. The hinge device of claim 10, wherein:
both ends of the first shaft are coupled to the first body; and
both ends of the second shaft are coupled to the second body.

12. The hinge device of claim 10, further comprising a bracket to:
separate the second shaft from the first shaft; and
align a longitudinal axis of the second shaft to be parallel with a longitudinal axis of the first shaft.

13. The hinge device of claim 10, wherein:
the first band is to allow the first shaft to rotate 180 degrees about a first shaft longitudinal axis; and
the second band is to allow the second shaft to rotate 180 degrees about a second shaft longitudinal axis.

14. The hinge device of claim 10, wherein the first band and the second band are wrapped together to form a single cable fiber.

15. An electronic device comprising:
a display housing;
a base housing;
a hinge device to rotationally couple the display housing and the base housing to one another, wherein the hinge device comprises:
  a first shaft having a circumferential outer surface area coupled to the display housing;
  a second shaft having a circumferential outer surface area coupled to the base housing, wherein:
    the second shaft is parallel to the first shaft; and
    the first shaft and the second shaft rotate in opposite directions about respective longitudinal axes as the electronic device is opened;
  a bracket to couple the align and separate the first shaft and the second shaft;
  a first band coupled to the shafts and having a surface area to wrap around the circumferential outer surface area of the first shaft in a first direction as the electronic device opens; and
  a second band coupled to the shafts and having a surface area to wrap around the circumferential outer surface area of the second shaft in a second direction as the electronic device opens.

16. The electronic device of claim 15, wherein:
the first band wraps around the second shaft in the first direction as the electronic device closes; and
the second band wraps around the first shaft in the second direction as the electronic device closes.

17. The electronic device of claim 15, wherein:
the first direction is a clockwise direction; and
the second direction is a counter-clockwise direction.

18. The electronic device of claim 15, wherein the bracket vertically aligns the first shaft and the second shaft.

* * * * *